(12) United States Patent
Kachi et al.

(10) Patent No.: US 12,209,565 B2
(45) Date of Patent: Jan. 28, 2025

(54) CONTROLLER FOR HYBRID ELECTRIC VEHICLE AND METHOD FOR CONTROLLING HYBRID ELECTRIC VEHICLE

(71) Applicant: TOYOTA JIDOSHA KABUSHIKI KAISHA, Aichi-ken (JP)

(72) Inventors: Masahiro Kachi, Nagakute (JP); Takehiro Komatsu, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 145 days.

(21) Appl. No.: 18/161,795

(22) Filed: Jan. 30, 2023

(65) Prior Publication Data

US 2023/0243329 A1    Aug. 3, 2023

(30) Foreign Application Priority Data

Feb. 2, 2022    (JP) .................................. 2022-014999

(51) Int. Cl.
*F02N 11/08*     (2006.01)
*B60W 20/15*     (2016.01)
(Continued)

(52) U.S. Cl.
CPC ......... *F02N 11/0859* (2013.01); *B60W 20/15* (2016.01); *F02D 41/065* (2013.01);
(Continued)

(58) Field of Classification Search
CPC ............ F02N 11/0859; F02N 11/0803; F02N 11/0851; F02N 2200/022; F02N 11/0844;
(Continued)

(56) References Cited

U.S. PATENT DOCUMENTS 8,307,926 B2 * 11/2012 Kusaka .............. F02D 13/0253
                                                180/65.265
2008/0099259 A1 * 5/2008 Tomo .................... B60L 15/20
                                                180/65.265
(Continued)

FOREIGN PATENT DOCUMENTS

JP    2009-002312 A    1/2009
JP    2009-166644 A    7/2009
(Continued)

*Primary Examiner* — Joseph J Dallo
(74) *Attorney, Agent, or Firm* — HAUPTMAN HAM, LLP (57) ABSTRACT

A controller executes a first restarting process when restarting of an engine is requested under a condition where an engine speed is less than a determination speed. In the first restarting process, cranking of the engine is performed by a motor generator in a state in which the motor generator is connected to a crankshaft through engagement of a clutch, and fuel injection and ignition are initiated in the engine when a combustion initiation condition is satisfied in this state. The controller executes a second restarting process when restarting of the engine is requested under a condition where the engine speed is greater than or equal to the determination speed. In the second restarting process, fuel injection and ignition are initiated in the engine, and the motor generator is connected to the crankshaft through engagement of the clutch after the engine has been restarted.

8 Claims, 4 Drawing Sheets

(51) Int. Cl.
*F02D 41/06* (2006.01)
*F02D 41/30* (2006.01)

(52) U.S. Cl.
CPC ...... *F02D 41/3076* (2013.01); *F02N 11/0803* (2013.01); *F02N 11/0851* (2013.01); *B60W 2510/0638* (2013.01); *F02N 2200/022* (2013.01)

(58) Field of Classification Search
CPC .......... F02N 99/002; F02N 2300/2002; F02N 11/04; B60W 20/15; B60W 2510/0638; B60W 2510/0208; B60W 2510/0657; B60W 2510/081; B60W 2510/083; B60W 2710/021; B60W 2710/0605; B60W 2710/0616; B60W 2710/0627; B60W 2710/0644; B60W 2710/0666; B60W 2710/081; B60W 2710/083; B60W 10/02; B60W 10/023; B60W 10/06; B60W 10/08; B60W 20/19; B60W 20/40; F02D 41/065; F02D 41/3076; F02D 41/022; F02D 41/042; F02D 2200/101; B60K 6/38; B60K 6/387; B60K 6/48; B60K 2006/4825; Y02T 10/62
See application file for complete search history.

(56) References Cited

U.S. PATENT DOCUMENTS

| | | | |
|---|---|---|---|
| 2009/0125172 A1* | 5/2009 | Matsubara | B60W 10/06 903/930 |
| 2012/0191322 A1* | 7/2012 | Garrard | F01M 1/20 701/103 |
| 2017/0305411 A1* | 10/2017 | Leone | F02D 41/042 |
| 2017/0306893 A1* | 10/2017 | Leone | F02D 41/064 |
| 2021/0129830 A1 | 5/2021 | Matsubara et al. | |

FOREIGN PATENT DOCUMENTS

| | | | | |
|---|---|---|---|---|
| JP | 2021054165 A | | 4/2021 | |
| WO | WO-2005116432 A1 | * | 12/2005 | ............. B60K 6/445 |
| WO | WO-2007112233 A2 | * | 10/2007 | ............... B60K 6/12 |
| WO | WO-2007138401 A2 | * | 12/2007 | ............. B60K 6/105 |
| WO | WO-2014068746 A1 | * | 5/2014 | ............... B60K 6/48 |

* cited by examiner

CONTROLLER FOR HYBRID ELECTRIC VEHICLE AND METHOD FOR CONTROLLING HYBRID ELECTRIC VEHICLE

RELATED APPLICATIONS

The present application claims priority of Japanese Application Number 2022-014999 filed on Feb. 2, 2022, the disclosure of which is hereby incorporated by reference herein in its entirety.

BACKGROUND

1. Field

The following description relates to a controller for a hybrid electric vehicle and a method for controlling a hybrid electric vehicle.

2. Description of Related Art

Japanese Laid-Open Patent Publication No. 2021-54165 discloses a hybrid electric vehicle that includes an engine, a motor generator, and a clutch arranged between a crankshaft of the engine and the motor generator. In such a hybrid electric vehicle, the motor generator is connected to the crankshaft when the clutch is in an engaged state. The motor generator is disconnected from the crankshaft when the clutch is in a disengaged state.

A controller applied to such a hybrid electric vehicle starts the engine by driving the motor generator when the clutch is in an engaged state to crank the engine. Then, when a predetermined combustion initiation condition is satisfied when the crankshaft is being rotated during the cranking, the controller initiates fuel injection control and fuel ignition control. This starts the engine.

In a hybrid electric vehicle, when the engine speed is being decreased as a result of fuel cut-off that suspends combustion in the engine, restarting of the engine may be requested. In such a case, it is desired that the stability of combustion be ensured when restarting the engine and that the engine be restarted promptly.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a hybrid electric vehicle controller for a hybrid electric vehicle is provided. The hybrid electric vehicle includes an engine having a crankshaft, a motor generator, and a clutch arranged between the crankshaft and the motor generator. The controller includes processing circuitry configured to execute a restarting process that restarts the engine in a situation in which combustion is suspended in the engine when restarting of the engine is requested. The restarting process includes a first restarting process executed in a situation in which an engine speed is decreasing as a result of suspension of combustion in the engine, and the engine speed is less than a determination speed when restarting of the engine is requested. The first restarting process cranks the engine, by driving the motor generator in a state in which the motor generator is connected to the crankshaft through engagement of the clutch, and initiates fuel injection and ignition in the engine when a combustion initiation condition becomes satisfied during the cranking. The restarting process further includes a second restarting process executed in a situation in which the engine speed is decreasing as a result of suspension of combustion in the engine, and the engine speed is greater than or equal to the determination speed when restarting of the engine is requested. The second restarting process initiates fuel injection and ignition in the engine and connects the motor generator to the crankshaft through engagement of the clutch after the engine is restarted.

In another general aspect, a method for controlling a hybrid electric vehicle is provided. The hybrid electric vehicle includes an engine having a crankshaft, a motor generator, and a clutch arranged between the crankshaft and the motor generator. The method includes, in a situation in which an engine speed is decreasing as a result of suspension of combustion in the engine, and the engine speed is less than a determination speed when restarting of the engine is requested, executing a first restarting process that cranks the engine, by driving the motor generator in a state in which the motor generator is connected to the crankshaft through engagement of the clutch, and initiates fuel injection and ignition in the engine when a combustion initiation condition becomes satisfied during the cranking. The method includes, in a situation in which the engine speed is decreasing as a result of suspension of combustion in the engine, and the engine speed is greater than or equal to the determination speed when restarting of the engine is requested, executing a second restarting process that initiates fuel injection and ignition in the engine and connects the motor generator to the crankshaft through engagement of the clutch after the engine is restarted.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of a controller for a hybrid electric vehicle will now be described with reference to FIGS. 1 to 6.

Figure 1:
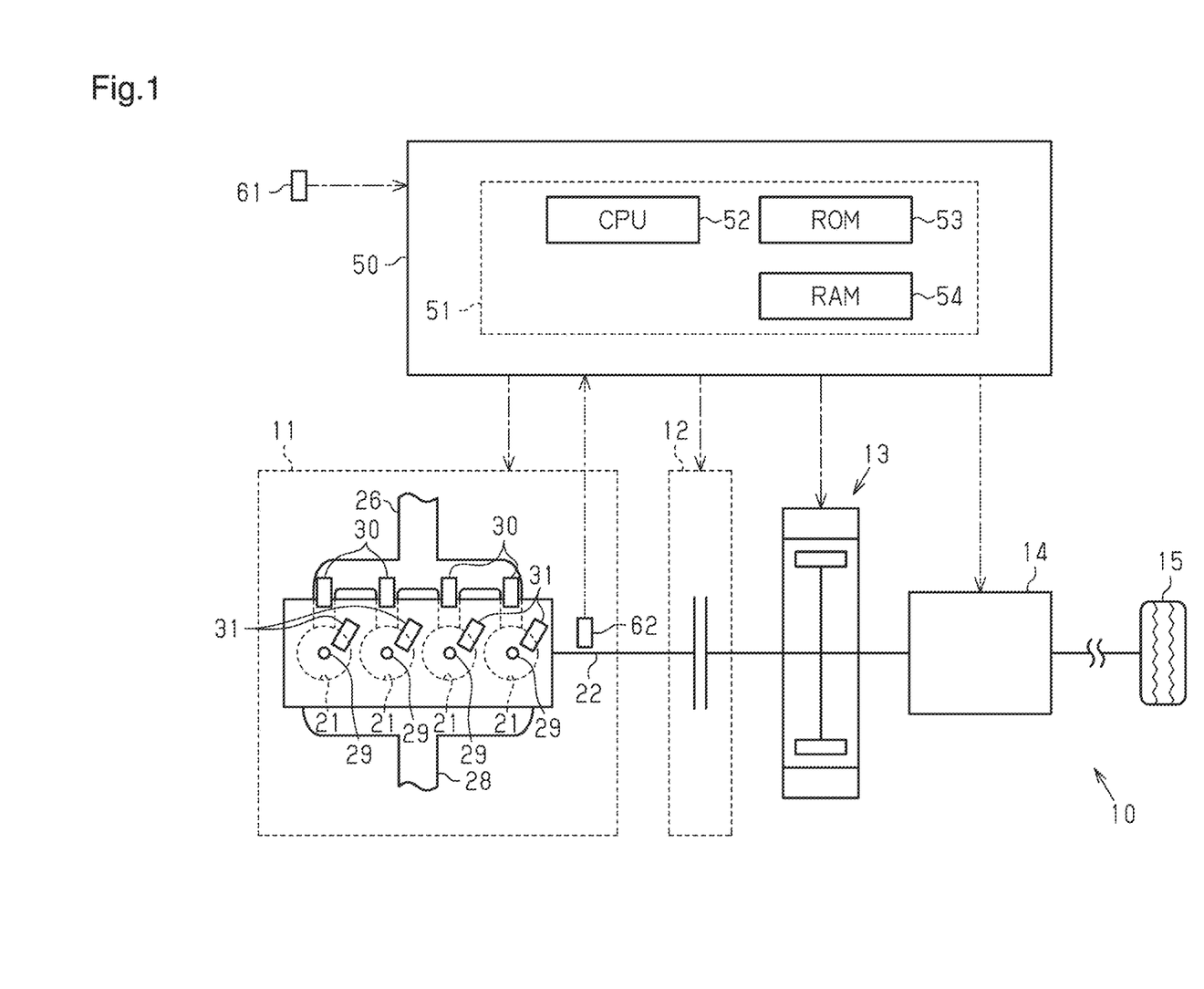
FIG. 1 is a schematic diagram of a hybrid electric vehicle including a controller, which is an embodiment of a hybrid electric vehicle controller, and a drive system controlled by the controller.

FIG. 1 schematically shows the configuration of a hybrid electric vehicle 10. The hybrid electric vehicle 10 includes a drive system of the hybrid electric vehicle 10 and a controller 50 that controls the drive system. In the present embodiment, the controller 50 corresponds to "the controller for a hybrid electric vehicle".

Drive System of Hybrid Electric Vehicle 10

The drive system of the hybrid electric vehicle 10 includes an engine 11, a clutch 12, a motor generator 13, a transmission 14, and a drive wheel 15. The clutch 12 is arranged between the engine 11 and the motor generator 13 in a power transmission path. Further, the transmission 14 is arranged between the motor generator 13 and the drive wheel 15 in the power transmission path.

Figure 2:
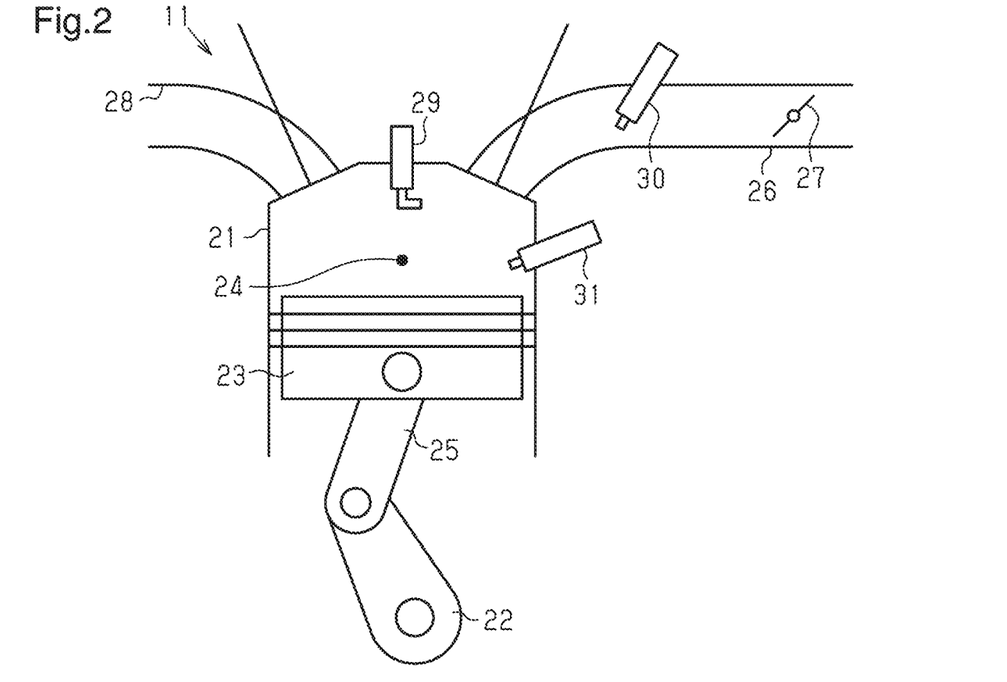
FIG. 2 is a schematic diagram of an engine in the drive system.

As shown in FIGS. 1 and 2, the engine 11 includes cylinders 21 and a crankshaft 22. A piston 23 is accommodated in each cylinder 21. The piston 23 defines a combustion chamber 24 in the cylinder 21. The piston 23 is moved back and forth in a direction that enlarges the volume of the combustion chamber 24 and a direction that reduces the volume. The pistons 23 are each coupled to the crankshaft 22 by a connecting rod 25. The crankshaft 22 is rotated by the reciprocation of the pistons 23. In other words, each piston 23 is reciprocated in the cylinder 21 in synchronization with the rotation of the crankshaft 22.

The engine 11 includes an intake passage 26 and an exhaust passage 28. Intake air is drawn through the intake passage 26 into the combustion chambers 24 of the cylinders 21. The amount of intake air flowing through the intake passage 26 can be adjusted by changing the degree at which a throttle valve 27 is open. Gas discharged from the combustion chambers 24 of the cylinders 21 flows through the exhaust passage 28.

The engine 11 includes ignition plugs 29 and fuel injection valves. In the example shown in FIG. 1, each cylinder 21 is provided with a single ignition plug 29. Further, fuel injection valves in the example shown in FIG. 1 include port injection valves 30 and in-cylinder injection valves 31. The port injection valves 30 inject fuel into the intake passage 26. The in-cylinder injection valves 31 inject fuel into the cylinders 21. In other words, each cylinder 21 is provided with one port injection valve 30 and one in-cylinder injection valve 31. In each combustion chamber 24, the corresponding ignition plug 29 produces a spark discharge to burn the mixture of the fuel injected from at least one of the port injection valve 30 and the in-cylinder injection valve 31 and the intake air drawn through the intake passage 26 into the combustion chamber 24. Combustion of the air-fuel mixture produces power that reciprocates the corresponding piston 23 in the cylinder 21, causing the crankshaft 22 to rotate. The exhaust resulting from combustion of the air-fuel mixture is discharged from the combustion chamber 24 into the exhaust passage 28.

The clutch 12 connects the crankshaft 22 and the motor generator 13. The controller 50 controls actuation of the clutch 12. The clutch 12 may be, for example, a hydraulically-driven clutch or an electromagnetically-driven clutch. When the clutch 12 is in an engaged state, the motor generator 13 is connected to the crankshaft 22. Thus, when the clutch 12 is in an engaged state, the crankshaft 22 can be rotated by driving the motor generator 13. When the clutch 12 is in a disengaged state, the motor generator 13 is disconnected from the crankshaft 22.

Controller 50

The controller 50 includes an execution device 51. The execution device 51 includes a central processing unit (CPU) 52, a read-only memory (ROM) 53, and a random-access memory (RAM) 54. The ROM 53 stores a control program executed by the CPU 52. The RAM 54 stores a calculation result of the CPU 52.

The controller 50 receives detection signals from various sensors arranged in the hybrid electric vehicle 10. The controller 50 receives detection signals from, for example, an accelerator pedal position sensor 61 and a crank angle sensor 62. The accelerator pedal position sensor 61 detects a throttle open degree AC, which corresponds to the depressed amount of the accelerator pedal, and outputs the detection result as a detection signal. The crank angle sensor 62 outputs a detection signal corresponding to an engine speed Ne, which is the rotation speed of the crankshaft 22. Accordingly, the controller 50 controls the engine 11, the clutch 12, the motor generator 13, and the transmission 14 based on the detection signals of the various sensors.

Travel control of the hybrid electric vehicle 10 includes hybrid travel control and electric travel control. In the hybrid travel control, traveling of the hybrid electric vehicle 10 is controlled by driving both the engine 11 and the motor generator 13. In the electric travel control, traveling of the hybrid electric vehicle 10 is controlled by driving only the motor generator 13.

In the hybrid travel control, the engine 11 may be stopped intermittently even when the hybrid electric vehicle 10 is traveling. When the engine 11 is stopped during the hybrid travel control, combustion in the engine 11 is suspended. Specifically, the execution device 51 performs fuel cut-off to stop the fuel injection by the fuel injection valves 30 and 31 and ignition by the ignition plugs 29. This suspends combustion in the engine 11 even when the hybrid electric vehicle 10 is traveling.

In the hybrid travel control, fuel cut-off may be performed when the crankshaft 22 is rotating. If the clutch 12 is in a disengaged state while the fuel cut-off is being performed, the engine speed Ne will decrease because, for example, the driving force of the motor generator 13 is not transmitted to the crankshaft 22. When the engine speed Ne is being decreased in such a manner or when the crankshaft 22 stops rotating, for example, the throttle open degree AC may be increased to request restarting of the engine 11. Further, when the hybrid electric vehicle 10 is being driven autonomously, an acceleration request resulting in restarting of the engine 11 may be input to the controller 50 from another controller governing autonomous driving.

Restarting Process of Engine 11

A routine executed by the execution device 51 to restart the engine 11 will now be described with reference to FIGS. 3 to 5. The execution device 51 executes the routine shown in FIG. 3 when restarting of the engine 11 is requested.

Figure 3:
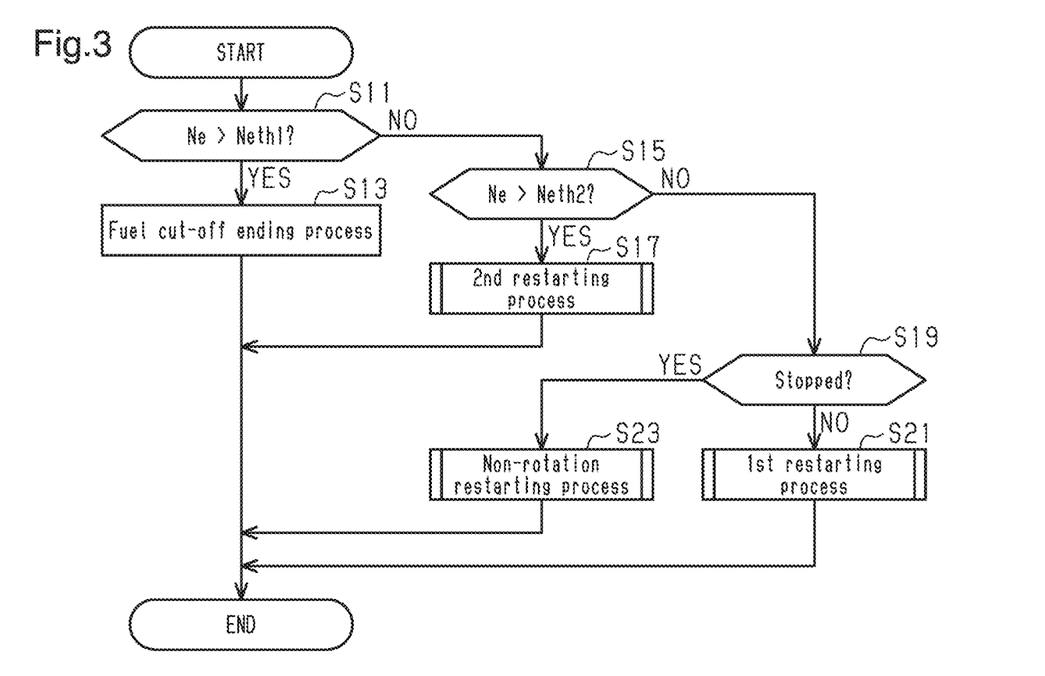
FIG. 3 is a flowchart illustrating a routine executed by the controller to start the engine.

In step S11 of the routine shown in FIG. 3, the execution device 51 determines whether the engine speed Ne is greater than a first determination speed Neth1. The first determination speed Neth1 serves as a reference for determining whether to perform a restarting process, which will be described later, or perform a fuel cut-off ending process. When the engine speed Ne is greater than the first determination speed Neth1 (S11: YES), the execution device 51 proceeds to step S13.

In step S13, the execution device 51 performs the fuel cut-off ending process. In the fuel cut-off ending process, the execution device 51 initiates fuel injection and ignition in the engine 11. For example, the execution device 51 injects fuel from the in-cylinder injection valves 31 so that stratified charge combustion is performed in the cylinders 21. In this case, the execution device 51 does not crank the engine 11 with the motor generator 13. When the engine 11 is restarted in the fuel cut-off ending process, the execution device 51 ends the routine.

When the engine speed Ne is less than or equal to the first determination speed Neth1 (NO) in step S11, the execution device 51 proceeds to step S15. In step S15, the execution device 51 determines whether the engine speed Ne is greater than a second determination speed Neth2. The second determination speed Neth2 is lower than the first determination speed Neth1. The second determination speed Neth2 serves as a reference for determining whether cranking is necessary to increase the engine speed Ne and restart the engine 11. When the engine speed Ne is greater than the second determination speed Neth2 (S15: YES), the execution device 51 proceeds to step S17.

In step S17, the execution device 51 executes a second restarting process as the restarting process. The second restarting process will be described in detail later. After the engine 11 is restarted in the second restarting process, the execution device 51 ends the routine.

When the engine speed Ne is less than or equal to the second determination speed Neth2 (NO) in step S15, the execution device 51 proceeds to step S19. In step S19, the execution device 51 determines whether the crankshaft 22 has stopped rotating. Specifically, the execution device 51 determines that the crankshaft 22 has stopped rotating when the engine speed Ne is less than or equal to a stop determination speed for a predetermined period or longer. The stop determination speed is lower than the first determination speed Neth1. For example, the stop determination speed is zero. When the execution device 51 determines that the crankshaft 22 has not stopped rotating (S19: NO), the execution device 51 proceeds to step S21. In step S21, the execution device 51 executes a first restarting process as the restarting process. The first restarting process will be described in detail later. After the engine 11 is started in the first restarting process, the execution device 51 ends the routine.

When the execution device 51 determines that the crankshaft 22 has stopped rotating (YES) in step S19, the execution device 51 proceeds to step S23. In step S23, the execution device 51 executes a non-rotation restarting process as the restarting process. The non-rotation restarting process will be described in detail later. After the engine 11 is started in the non-rotation restarting process, the execution device 51 ends the routine.

First Restarting Process

The first restarting process will now be described with reference to FIG. 4. The routine shown in FIG. 4 illustrates the flow of the first restarting process.

In step S31 of the present routine, the execution device 51 determines whether the clutch 12 is in a disengaged state. When the execution device 51 determines that the clutch 12 is in a disengaged state (S31: YES), the execution device 51 proceeds to step S33. When the execution device 51 determines that the clutch 12 is not in a disengaged state (S31: NO), the clutch 12 is in an engaged state, and the execution device 51 proceeds to step S35.

In step S33, the execution device 51 executes an engaging process of shifting the clutch 12 to an engaged state. When the clutch 12 is shifted to an engaged state in the engaging process, the motor generator 13 is connected to the crankshaft 22. Then, the execution device 51 proceeds to step S35.

The clutch 12 may be shifted to an engaged state when the engine speed Ne is less than or equal to the second determination speed Neth2. If the clutch 12 has already been shifted to an engaged state before the first restarting process is executed, steps S31 and S33 may be omitted from the routine.

In step S35, the execution device 51 drives the motor generator 13 to crank the engine 11. In other words, the execution device 51 drives the motor generator 13 to increase the engine speed Ne.

In step S37, the execution device 51 determines whether a predetermined combustion initiation condition has been satisfied. As the engine speed Ne becomes lower, the force acting to continuously rotate the crankshaft 22 becomes smaller. Thus, when restarting the engine 11 in a state in which the engine speed Ne is relatively low, the engine speed Ne is increased by a certain extent before initiating combustion. This ensures the stability of combustion. By restarting the engine 11 after cranking increases the force acting to continuously rotate the crankshaft 22 by a certain extent, the stability of combustion will be readily ensured when the engine 11 is restarted. Accordingly, the combustion initiation condition is set to determine whether the stable combustion can be ensured when restarting the engine 11.

In the present embodiment, the combustion initiation condition includes the following condition. Specifically, the combustion initiation condition includes, after starting cranking by driving the motor generator 13, whether the number of cylinders 21 in which the piston 23 moved beyond a compression top dead center has reached a predetermined number Xth. The predetermined number Xth is set to a value that is less than or equal to the number of cylinders 21 in the engine 11 and greater than one. In the example shown in FIG. 1, the number of cylinders 21 is four. Thus, the predetermined number Xth is set to, for example, any of two, three, or four.

The execution device 51 detects the position of each piston 23 from a detection signal of the crank angle sensor 62. This allows the execution device 51 to determine whether the piston 23 has reached the compression top dead center. When any of the pistons 23 reaches the compression top dead center, the execution device 51 increments a counter value by one. When a further piston 23, differing from the piston 23 that reached the compression top dead center, reaches the top dead center, the execution device 51 further increments the counter value by one. The execution device 51 starts updating the counter value when cranking is initiated. When the counter value reaches the predetermined number Xth, the execution device 51 determines that the number of cylinders 21 in which the piston 23 moved beyond the compression top dead center has reached the predetermined number Xth after cranking was initiated. In other words, the execution device 51 determines that the combustion initiation condition is satisfied.

The execution device 51 repeats the determination of step S37 until the combustion initiation condition is satisfied. When the combustion initiation condition is satisfied (S37: YES), the execution device 51 proceeds to step S39.

In step S39, the execution device 51 initiates combustion in the engine 11. For example, the execution device 51 injects fuel from the in-cylinder injection valves 31 so that stratified charge combustion is performed in the cylinders 21. After initiating fuel injection and ignition in this manner, the execution device 51 proceeds to step S41.

In step S41, the execution device 51 determines whether restarting of the engine 11 has been completed. For example, it is considered that restarting of the engine 11 has been completed when the engine 11 is in a combustion completion state. When the engine 11 is not in a combustion completion state, it is considered that restarting of the engine 11 is incomplete. Further, when the execution device 51 determines that restarting of the engine 11 is incomplete (S41: NO), the execution device 51 repeats the determination of step S41 until determining that restarting of the engine 11 has been completed. Then, when the execution device 51 determines that restarting of the engine 11 has been completed (S41: YES), the execution device 51 ends the routine. That is, the execution device 51 ends the first restarting process.

Non-Rotation Restarting Process

Figure 4:
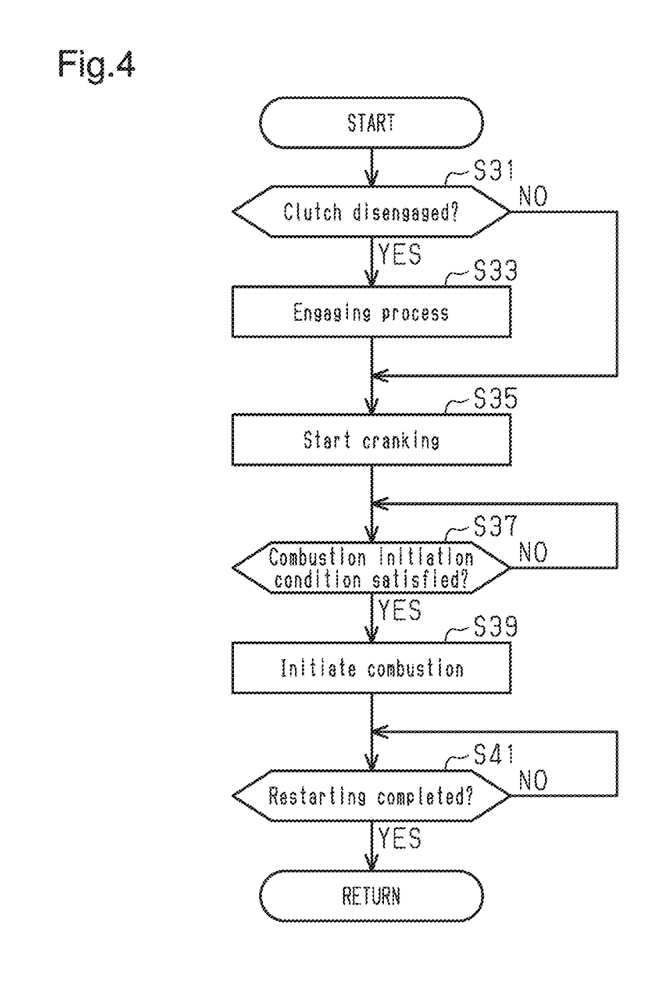
FIG. 4 is a flowchart illustrating a first restarting process.
Figure 5:
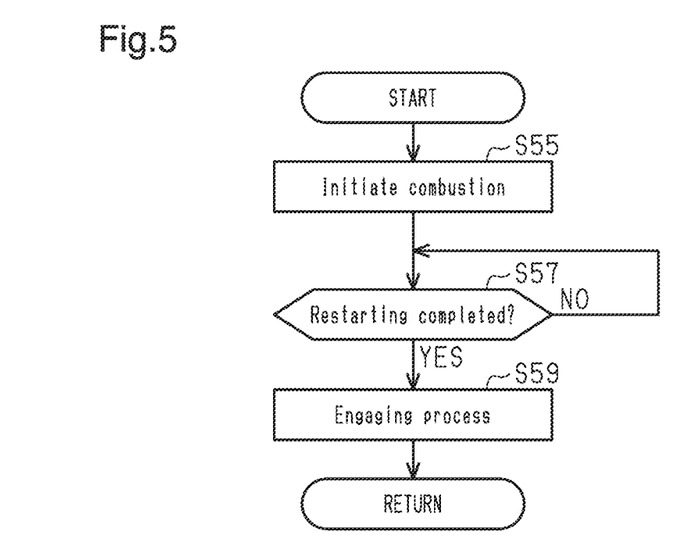
FIG. 5 is a flowchart illustrating a second restarting process.

The contents of the non-rotation restarting process are substantially the same as the first restarting process illustrated in FIG. 4 except for the combustion initiation condition. The non-rotation restarting process differs from the first restarting process in the predetermined number Xth. For example, the predetermined number Xth in the non-rotation restarting process is smaller than that in the first restarting process.

Second Restarting Process

The second restarting process will now be described with reference to FIG. 5. The routine shown in FIG. 5 illustrates the flow of the second restarting process. In the present embodiment, under a condition where the fuel cut-off is being performed, the clutch 12 is in a disengaged state if the engine speed Ne is greater than the second determination speed Neth2.

In step S55 of the present routine, the execution device 51 initiates combustion in the engine 11. For example, the execution device 51 injects fuel from the in-cylinder injection valves 31 so that stratified charge combustion is performed in the cylinders 21. After initiating fuel injection and ignition in this manner, the execution device 51 proceeds to step S57.

In step S57, the execution device 51 determines whether restarting of the engine 11 has been completed in the same manner as the above-described step S41. When the execution device 51 determines that restarting of the engine 11 is incomplete (S57: NO), the execution device 51 repeats the determination of step S57 until determining that restarting of the engine 11 has been completed. Then, when the execution device 51 determines that restarting of the engine 11 has been completed (S57: YES), the execution device 51 proceeds to step S59.

In step S59, the execution device 51 executes an engaging process for shifting the clutch 12 to an engaged state. When the clutch 12 is shifted to an engaged state in the engaging process, the motor generator 13 is connected to the crankshaft 22. Then, the execution device 51 ends the routine. That is, the execution device 51 ends the second restarting process. In the second restarting process, the engine 11 is restarted before shifting the clutch 12 to an engaged state regardless of whether the combustion initiation condition has been satisfied.

Operation and Advantage of Present Embodiment

The operation and advantages of the present embodiment will now be described with reference to FIG. 6.

Figure 6:
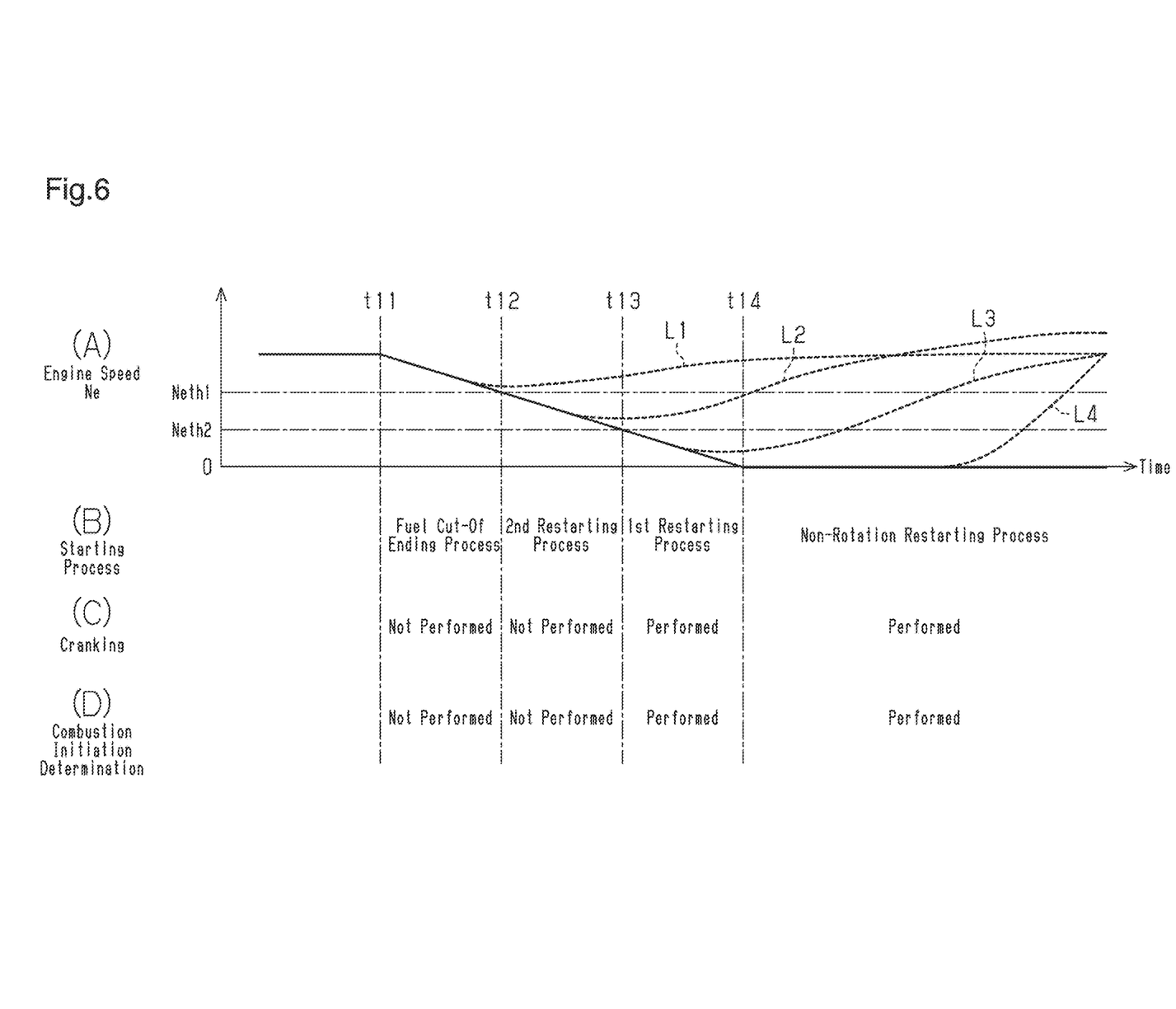
In FIG. 6, part (A) shows changes in an engine speed, part (B) shows a starting process selected by the controller, part (C) shows whether cranking is performed when starting the engine, and part (D) shows whether a combustion initiation determination is executed before starting the engine.

In the example shown in part (A) of FIG. 6, fuel cut-off is initiated at time t11 when the engine 11 is running. Thus, the engine speed Ne starts to decrease. The solid line shown in part (A) of FIG. 6 indicates changes in the engine speed Ne when the engine 11 is not restarted. When the engine 11 is not restarted, the engine speed Ne becomes lower than the first determination speed Neth1 at time t12. Further, the engine speed Ne becomes lower than the second determination speed Neth2 at time t13. Then, the engine speed Ne becomes zero at time t14. In other words, the crankshaft 22 stops rotating.

(1) Fuel Cut-Off Ending Process

In a situation in which combustion in the engine 11 has been suspended by fuel cut-off, restarting of the engine 11 may be requested when the engine speed Ne is greater than the first determination speed Neth1. In this case, as shown in part (B) of FIG. 6, the execution device 51 performs the fuel cut-off ending process. In the fuel cut-off ending process, the execution device 51 does not perform cranking, as shown in part (C) of FIG. 6, and does not determine whether the combustion initiation condition has been satisfied, as shown in part (D) of FIG. 6. In the description hereafter, the determination of whether the combustion initiation condition has been satisfied will be referred to as "the combustion initiation determination".

After combustion is restarted in the engine 11 by the fuel cut-off ending process, the engine speed Ne changes as indicated by broken line L1 shown in part (A) of FIG. 6.

(2) Second Restarting Process

In a situation in which combustion in the engine 11 has been suspended by fuel cut-off, restarting of the engine 11 may be requested when the engine speed Ne is less than or equal to the first determination speed Neth1 and greater than the second determination speed Neth2. In this case, as shown in part (B) of FIG. 6, the execution device 51 performs the second restarting process. In the second restarting process, the execution device 51 does not perform cranking, as shown in part (C) of FIG. 6, and does not perform the combustion initiation determination, as shown in part (D) of FIG. 6.

Specifically, the second restarting process injects and ignites fuel in the engine 11 without performing the combustion initiation determination before the clutch 12 connects the motor generator 13 to the crankshaft 22. This allows the engine 11 to be restarted more quickly than when the first restarting process is performed. After the engine 11 is restarted in the second restarting process, the engine speed Ne changes as indicated by broken line L2 shown in part (A) of FIG. 6. The clutch 12 is shifted to an engaged state after the engine 11 is restarted.

The engine speed Ne is higher when the second restarting process is performed than when the first restarting process is performed. In other words, the engine 11 is restarted in a state in which force acting to continue rotating the crankshaft 22 is relatively high. In this case, the motor generator 13 does not have to crank the engine 11 to ensure stability of combustion for restarting of engine 11. Accordingly, the second restarting process is performed when restarting the engine 11 in a state in which the engine speed Ne is less than or equal to the first determination speed Neth1 and greater than the second determination speed Neth2. This restarts the engine 11 promptly while ensuring the stability of combustion.

If the first restarting process were to be performed to restart the engine 11 when the engine speed Ne is greater than the second determination speed Neth2, the engine 11 would be restarted while being cranked by the motor generator 13. In this case, the driving force generated by the motor generator 13 and the power produced by combustion would both be transmitted to the crankshaft 22. This may rapidly increase the engine speed Ne when the engine 11 is restarted.

In this respect, in the present embodiment, the second restarting process is performed instead of the first restarting process when the engine speed Ne is greater than the second determination speed Neth2. This avoids a rapid increase in the engine speed Ne when the engine 11 is restarted.

(3) First Restarting Process

In a situation in which combustion in the engine 11 has been suspended by fuel cut-off, restarting of the engine 11 may be requested when the engine speed Ne is less than or equal to the second determination speed Neth2 but the crankshaft 22 has not stopped rotating. In this case, as shown in part (B) of FIG. 6, the execution device 51 performs the first restarting process. In the first restarting process, the execution device 51 performs cranking, as shown in part (C) of FIG. 6, and combustion initiation determination, as shown in part (D) of FIG. 6. Then, when the combustion initiation condition is satisfied, the execution device 51 initiates fuel injection and ignition in the engine 11.

Specifically, the first restarting process cranks the engine 11 by driving the motor generator 13 in a state in which the motor generator 13 is connected to the crankshaft 22 by engagement of the clutch 12. Then, when the combustion initiation condition becomes satisfied during cranking, fuel injection and ignition are initiated in the engine 11. In other words, cranking is performed to increase the engine speed Ne before restarting the engine 11 when restarting the engine 11 in a situation in which the engine speed Ne is relatively low. This restarts the engine 11 when combustion is stable in the engine 11. After the first restarting process restarts the engine 11 in this manner, the engine speed Ne changes as indicated by the broken line L3 shown in part (A) of FIG. 6.

(4) Non-Rotation Restarting Process

In a situation in which combustion in the engine 11 has been suspended by fuel cut-off, restarting of the engine 11 may be requested when the crankshaft 22 has stopped rotating. In this case, as shown in part (B) of FIG. 6, the execution device 51 performs the non-rotation restarting process. In the restarting process for when rotation has been stopped, the execution device 51 performs cranking, as shown in part (C) of FIG. 6, and the combustion initiation determination, as shown in part (D) of FIG. 6. Then, when the combustion initiation condition is satisfied, the execution device 51 initiates fuel injection and ignition in the engine 11. This restarts the engine 11 when combustion is stable in the engine 11. After the engine 11 is restarted in the restarting process for when rotation has been stopped in this manner, the engine speed Ne changes as indicated by the broken line L4 shown in part (A) of FIG. 6.

As described above, when restarting the engine 11 in a state in which the engine speed Ne is not relatively low, the engine 11 is restarted before connecting the motor generator 13 to the crankshaft 22 by the clutch 12. On the other hand, when restarting the engine 11 in a state in which the engine speed Ne is relatively low, the motor generator 13 is connected to the crankshaft 22 by the clutch 12 to crank the engine 11 with the motor generator 13 before restarting the engine 11. In this manner, in the present embodiment, combustion is stable when restarting the engine 11, and the engine 11 is restarted promptly.

Modified Examples

The above embodiment may be modified as follows. The above embodiment and the following modifications can be combined as long as the combined modifications remain technically consistent with each other.

The combustion initiation condition of the first restarting process may be changed from that described in the above embodiment. For example, the combustion initiation condition may include a condition where a predetermined time has elapsed from a time point at which cranking of the engine 11 was started by driving the motor generator 13. Further, for example, the combustion initiation condition may include a condition where the engine speed Ne has been increased by a predetermined amount from when the motor generator 13 starts cranking the engine 11.

The determination process of step S31 may be omitted from the routine shown in FIG. 4 if the clutch 12 is disengaged when fuel cut-off is performed.

A control configuration may be employed such that the clutch is not disengaged even when fuel cut-off is performed. In this case, if the second restarting process is executed to restart the engine 11, a determination of whether the clutch 12 is in an engaged state may be performed before initiating combustion in engine 11. When the clutch 12 is in an engaged state, the second restarting process may be executed after releasing the clutch 12. When the clutch 12 is not in an engaged state, the second restarting process may be executed to readily initiate combustion in the engine 11.

The execution device 51 is not limited to a device that includes the CPU 52 and the ROM 53 and executes software processing. Specifically, the execution device 51 may only have any of the following configurations (a) to (c).

(a) The execution device 51 includes a software execution device formed by one or more processors that execute various processes in accordance with a computer program. Each processor includes a CPU and a memory, such as a RAM and a ROM. The memory stores program codes or commands that are configured to have the CPU execute a process. The memory, which is a computer readable medium, may be any available medium that is accessible by a versatile or dedicated computer.

(b) The execution device 51 includes one or more exclusive hardware circuits that execute various processes. Examples of the exclusive hardware circuit include an application specific integrated circuit (ASIC), a field programmable gate array (FPGA), and the like.

(c) The execution device 51 includes a processor that executes part of various processes in accordance with a computer program and an exclusive hardware circuit that executes the remaining processes. In other words, the above-described processes may be executed by processing circuitry that includes at least one of a software execution device and an exclusive hardware circuit.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A hybrid electric vehicle controller for a hybrid electric vehicle that includes an engine having a crankshaft, a motor generator, and a clutch arranged between the crankshaft and the motor generator, the controller comprising:

processing circuitry configured to execute a restarting process that restarts the engine in a situation in which combustion is suspended in the engine when restarting of the engine is requested, wherein:

the restarting process includes a first restarting process executed in a situation in which an engine speed is decreasing as a result of suspension of combustion in the engine, and the engine speed is less than a determination speed when restarting of the engine is requested;

the first restarting process cranks the engine, by driving the motor generator in a state in which the motor generator is connected to the crankshaft through engagement of the clutch, and initiates fuel injection and ignition in the engine when a combustion initiation condition becomes satisfied during the cranking;

the restarting process further includes a second restarting process executed in a situation in which the engine speed is decreasing as a result of suspension of combustion in the engine, and the engine speed is greater than or equal to the determination speed when restarting of the engine is requested; and the second restarting process initiates fuel injection and ignition in the engine and connects the motor generator to the crankshaft through engagement of the clutch after the engine is restarted, wherein the engine includes cylinders and pistons that are respectively reciprocated in the cylinders in synchronization with rotation of the crankshaft, and the combustion initiation condition is a number of cylinders in which the piston is moved beyond a compression top dead center reaching a predetermined number after starting the cranking by driving the motor generator.

2. A method for controlling a hybrid electric vehicle that includes an engine having a crankshaft, a motor generator, and a clutch arranged between the crankshaft and the motor generator, the method comprising:

in a situation in which an engine speed is decreasing as a result of suspension of combustion in the engine, and the engine speed is less than a determination speed when restarting of the engine is requested, executing a first restarting process that cranks the engine, by driving the motor generator in a state in which the motor generator is connected to the crankshaft through engagement of the clutch, and initiates fuel injection and ignition in the engine when a combustion initiation condition becomes satisfied during the cranking; and in a situation in which the engine speed is decreasing as a result of suspension of combustion in the engine, and the engine speed is greater than or equal to the determination speed when restarting of the engine is requested, executing a second restarting process that initiates fuel injection and ignition in the engine and connects the motor generator to the crankshaft through engagement of the clutch after the engine is restarted, wherein the engine includes cylinders and pistons that are respectively reciprocated in the cylinders in synchronization with rotation of the crankshaft, and the combustion initiation condition is a number of cylinders in which the piston is moved beyond a compression top dead center reaching a predetermined number after starting the cranking by driving the motor generator.

3. The hybrid electric vehicle controller according to claim 1, wherein the predetermined number for the second restarting process is less than the predetermined number for the first restarting process.

4. The hybrid electric vehicle controller according to claim 1, wherein the restarting process includes a non-rotation restarting process in a situation in which rotation of the crankshaft has stopped, and the non-rotation restarting process includes cranking the engine, by driving the motor generator in the state in which the motor generator is connected to the crankshaft through engagement of the clutch.

5. The hybrid electric vehicle controller according to claim 4, wherein the non-rotation restarting process further includes initiating fuel injection and ignition in the engine when the combustion initiation condition becomes satisfied during the cranking, and restarting the engine in response to a determination that combustion in the engine is stable.

6. The method for controlling the hybrid electric vehicle according to claim 2, wherein the predetermined number for the second restarting process is less than the predetermined number for the first restarting process.

7. The method for controlling the hybrid electric vehicle according to claim 2, wherein the restarting process includes a non-rotation restarting process in a situation in which rotation of the crankshaft has stopped, and the non-rotation restarting process includes cranking the engine, by driving the motor generator in the state in which the motor generator is connected to the crankshaft through engagement of the clutch.

8. The method for controlling the hybrid electric vehicle according to claim 7, wherein the non-rotation restarting process further includes initiating fuel injection and ignition in the engine when the combustion initiation condition becomes satisfied during the cranking, and restarting the engine in response to a determination that combustion in the engine is stable.

* * * * *